United States Patent
Bernardi et al.

(10) Patent No.: US 7,346,176 B1
(45) Date of Patent: Mar. 18, 2008

(54) AUTO-ADJUST NOISE CANCELING MICROPHONE WITH POSITION SENSOR

(75) Inventors: Robert J Bernardi, Scotts Valley, CA (US); Steven F Burson, Scotts Valley, CA (US); Lawrence W Gollbach, Felton, CA (US); Allen Woo, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 416 days.

(21) Appl. No.: 09/854,304

(22) Filed: May 11, 2001

Related U.S. Application Data

(60) Provisional application No. 60/203,218, filed on May 11, 2000.

(51) Int. Cl.
*H04R 3/00* (2006.01)

(52) U.S. Cl. .................. 381/92; 381/313

(58) Field of Classification Search .......... 381/92, 381/122, 313, 94.7, 56, 356, 358; 379/441, 379/396, 349; 375/349

See application file for complete search history.

(56) References Cited

U.S. PATENT DOCUMENTS

| | | | | |
|---|---|---|---|---|
| 3,875,349 A | * | 4/1975 | Ruegg | 381/313 |
| 4,777,649 A | * | 10/1988 | Carlson et al. | 704/233 |
| 5,384,843 A | * | 1/1995 | Masuda et al. | 379/391 |
| 5,524,056 A | * | 6/1996 | Killion et al. | 381/314 |
| 5,579,046 A | * | 11/1996 | Mitsuhashi et al. | 348/231.4 |
| 5,732,143 A | * | 3/1998 | Andrea et al. | 381/71.6 |
| 6,148,077 A | * | 11/2000 | Fullam et al. | 379/387.01 |
| 6,285,768 B1 | * | 9/2001 | Ikeda | 381/71.11 |
| 6,389,142 B1 | * | 5/2002 | Hagen et al. | 381/313 |
| 2001/0028718 A1 | * | 10/2001 | Hou | 381/92 |

* cited by examiner

*Primary Examiner*—Sinh Tran
*Assistant Examiner*—Walter F Briney, III
(74) *Attorney, Agent, or Firm*—Jung-Hua Kuo

(57) ABSTRACT

A system and method detects whether or not a microphone apparatus is positioned incorrectly relative to an acoustic source and of automatically compensating for such mispositioning. A position estimation circuit determines whether the microphone apparatus is mispositioned. A controller facilitates the automatic compensation of the mispositioning.

33 Claims, 8 Drawing Sheets

AUTO-ADJUST NOISE CANCELING MICROPHONE WITH POSITION SENSOR

CROSS-REFERENCE TO RELATED APPLICATIONS

This application claims priority under 35 U.S.C. § 119(e) from copending U.S. Provisional Application No. 60/203,218, filed on May 11, 2000 by Robert J. Bernardi, et al., entitled "Auto-Adjust Noise Canceling Microphone with Position Sensor" the subject matter of which is herein incorporated by reference in its entirety.

TECHNICAL FIELD

The invention relates generally to the field of communication headsets, and more specifically, to proximity detection, estimation and the automatic compensation of the mispositioning of a microphone assembly relative to a desired acoustic source. Additionally, the present invention also relates to the detection, estimation and automatic compensation of whether a signal from an acoustic source is too low.

BACKGROUND OF THE INVENTION

Noise canceling microphones (referred to interchangeably herein as "NC mics") are a desirable option for communication headsets used in potentially noisy environments. Unlike simpler omindirectional microphones (referred to interchangeably herein as "omni mics"), a NC mic has reduced sensitivity to distant sounds. Instead, a NC mic is generally more sensitive where the distance from the NC microphone to the acoustic source is located nearby, as opposed to sources of ambient or background sounds. Often times, however, a user does not optimally position a NC mic, like that included in a communications headset. The mispositioned NC microphone reduces sensitivity to the user's voice, and this in turn reduces the signal-to-noise ratio (SNR). Severe misposition of the NC mic is also problematic because the user's voice will be attenuated to a degree that is unintelligible for the receiving entity (e.g., person or machine) on the other end of the communication link.

This deleterious effect is caused by two related characteristics of NC mics. A first order NC mic measures the sound pressure at two nearby points in space. This can be accomplished via a single mic with sound ported to the front and rear of a diaphragm, typically from two openings acting as pick-up points for the single mic. The sound waves received at the two openings impinge on both sides of the diaphragm so that noise canceling effects may be effectuated. A NC mic measuring sound pressure at two nearby points in space may also be constructed from two separate mics electrically connected, each with a single opening for sound to reach the diaphragm. To form a NC mic assembly from the two separate mics, the near instantaneous difference of the sound pressure level at the two points is taken. This difference typically gives the NC mic assembly a polar pattern (i.e., different sensitivity from different directions) and a proximity effect (i.e., greater drop-off with increasing distance than one omni mic). Whichever way the NC mic is formed, the problem remains that either angular mispositioning (i.e., polar pattern related) or distance mispositioning (i.e., proximity effect related) or the combination of the two lead to degraded SNR.

One conventional technique for preventing a microphone from becoming mispositioned with respect to an acoustic source entails headsets integrated with the microphone, where a cup is provided to align the user's chin to the mic. This technique is cumbersome and impractical for lightweight communications headsets, which generally require the user to readily and quickly put on and take off the headset.

Another conventional technique used to accommodate the mispositioning of a microphone includes the lowering of the microphone's noise canceling effectiveness as a tradeoff for more flexibility of the microphone positioning. This technique is also unsatisfactory because it effectively causes the microphone to be less useful in high noise environment applications. Additionally, this conventional technique also comprises the headset having less noise canceling features.

Yet another conventional technique that attempts to address the mispositioning of a microphone utilizes a non-linear Automatic Gain Control (AGC) amplifier. The AGC amplifier typically provides low gain when the microphone output is low and provides high gain when the microphone output is high. This technique is problematic because it does not increase the SNR when the user is speaking, but rather reduces background noise during pauses in between speech.

Accordingly, what is needed is a technique for determining whether a microphone assembly, such as used in a lightweight headset, is positioned incorrectly with respect to an acoustic source, such as a user's mouth. Upon determining that a microphone assembly is mispositioned, it is desirable to have a way for the microphone assembly to provide automatic compensation of signal degradation resulting from the mispositioned microphone assembly. It is further desired to have a manner of detecting and of compensating for a situation where the acoustic signal from the acoustic source is too low. Also, it would be beneficial if the NC microphone assembly provided a user an indication of the proximity and angular error resulting from the microphone misposition, so that the microphone assembly may be repositioned.

SUMMARY OF DESCRIBED EMBODIMENTS

The described embodiments of the present invention includes a system, method and other embodiments having at least two microphones combined in a microphone apparatus, and that can detect whether or not the microphone apparatus is positioned incorrectly relative to an acoustic source and automatically compensate for such mispositioning. One aspect of the present invention is to provide a microphone with noise canceling features, unless the microphone is prevented from doing so when it is mispositioned relative to the acoustic source. Another aspect of the invention includes a method of altering the directional response of the microphone apparatus using a controller which automatically adjusts the polar response pattern of the microphone apparatus to provide a substitute output audio signal until the positioning error is corrected. In the described embodiments, this substitute output signal may comprise an output signal from at least one of the two microphones, a NC microphone signal derived from the two microphones, or a signal that has a different level of NC features. Yet another aspect of the present invention includes a means for informing the user that the microphone apparatus is mispositioned.

When incorrect positioning of the microphone is detected, the system and method in accordance with the present invention automatically adjusts the polar response pattern of the microphone to provide improved pick-up of the acoustic source.

One aspect of the present invention separately provides an indication to the user that the microphone requires corrective action of being repositioned. When the positioning error is corrected, the polar response pattern of the microphone apparatus is optimized for noise rejection and an indicator is disengaged. Accordingly, a user can have an active part in ensuring the high performance of an NC mic. For periods before proper proximity and position of the microphones are restored, speech level is maintained via automatic adjustment of the pick-up features described herein The present invention also provides a solution for those situations where the high quality noise canceling features of a NC mic are desirable, but not necessarily the high position sensitivity characteristic. The high position sensitivity of a NC mic often makes it position sensitive and ill-suited for being mispositioned relative to the acoustic source. On the other hand, omnidirectional microphones are not position sensitive, but do not generally include NC features. An aspect of the present invention provides a microphone directional response that is intermediate to the characteristics associated with the NC mic and the omnidirectional mic.

A system for sensing and compensating for at least one error signal, amongst audio signals produced from the acoustic signals originating from a desired acoustic source, based on proximity of the desired acoustic source is also described. The system includes a first microphone disposed at a first distance from the desired acoustic source, a second microphone disposed at a second distance from the desired acoustic source, a position estimation circuit configured to sense the signals being received by the first microphone and the second microphone along with positional errors, and to produce an error signal. The system further includes a controller configured to utilize the error signal to selectively control an output audio signal based on at least one of the first microphone and the second microphone.

In one embodiment, the controller uses the error signal to select an audio output that has either high quality noise canceling features or an omnidirectional polar pattern. In another embodiment, the error signal is generated from a state machine and comprises a plurality of states. The plurality of states are used to selectively control a programmable phase shift network to introduce a phase shift into the output of one of the two microphones. By doing so, the audio output may be determined and encompass a range of directional responses, comprising, for example, figure-eight, hypercardioid, cardioid and omnidirectional polar patterns. In this particular embodiment, the directional responses may be generated incrementally and on-the-fly, depending upon the severity of the microphone misposition. Each successive adjustment from a figure eight towards an omnidirectional polar pattern increases the tolerance for angular and proximity adjustment at the expense of signal-to-noise ratio degradation. Other embodiments of the present invention are also described.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system, apparatus, method and other embodiments are described for determining and automatically compensating for a degraded signal-to-noise ratio resulting from noise canceling microphones having angular and/or distance mispositioning relative to an acoustic source. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

A. Auto-Adjustment of Noise Canceling Microphones Between Two States

Figure 1:
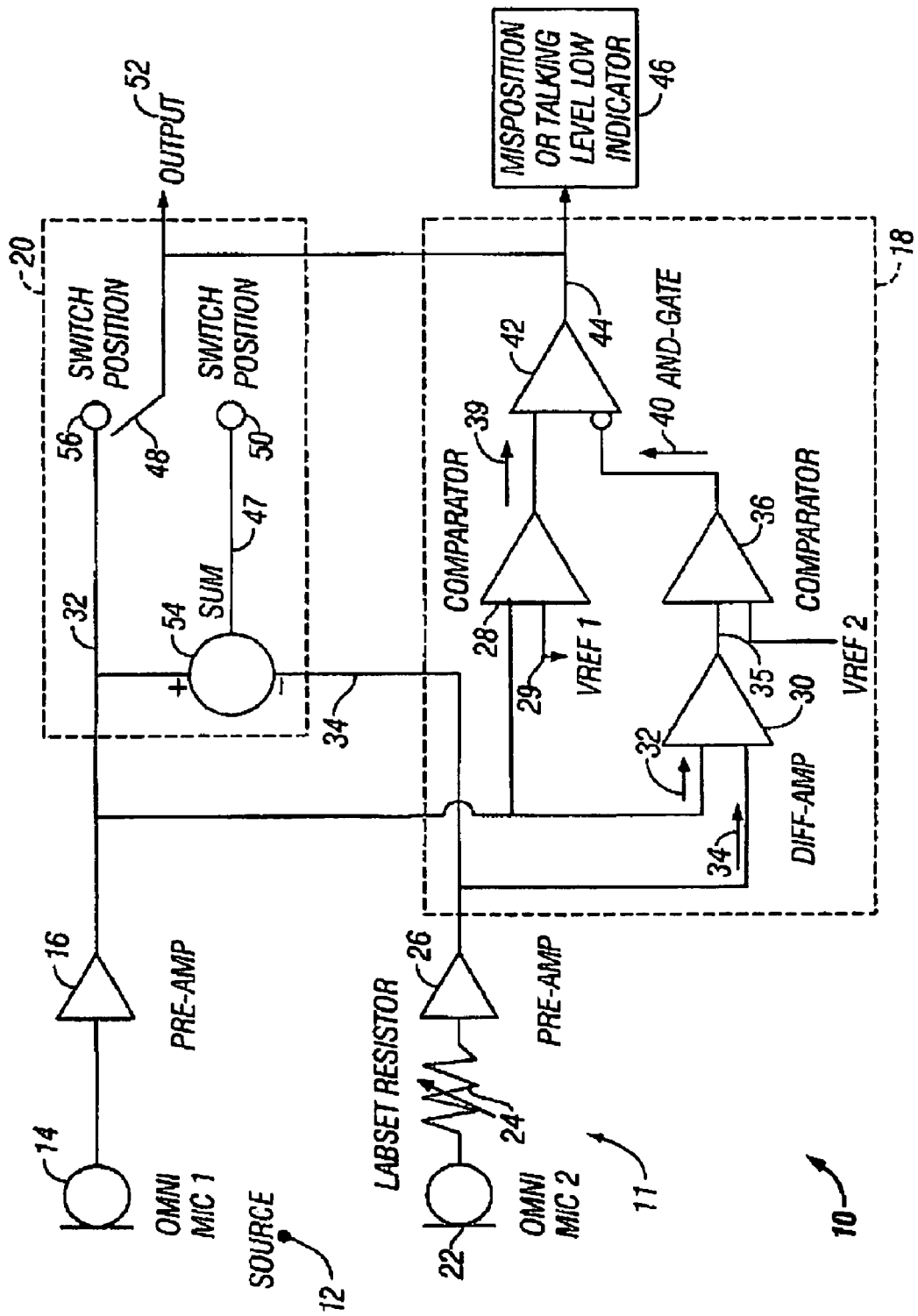
FIG. 1 is a functional block diagram of a first embodiment of a microphone proximity correction system having two automatic correction states.

FIG. 1 illustrates a functional block diagram of a microphone proximity correction system 10 in accordance with a first embodiment of the present invention. The system 10 advantageously detects whether or not a microphone apparatus (or assembly) 11 is mispositioned relative to an acoustic source 12. When the microphone apparatus 11 is mispositioned, typically, the acoustic signals received by the microphone assembly are at an inadequate level and result in a degraded output audio signal. For example, the person or machine at the other end of the communication link and receiving the microphone audio output is unable to adequately hear the user. The system 10 senses the mispositioning using position estimation and automatically adjusts the polar and directional response pattern of the microphone apparatus to compensate for the degraded output audio signal, so that the angular positioning and proximity error can be eventually corrected. As will become evident in the discussion to follow, this aspect of the automatic adjustment of the system 10 comprises selecting the audio output to be derived from one or more of the microphones.

The microphone apparatus 11 of the proximity correction system 10 is capable of detecting the signals generated by an acoustic source 12, and includes a first microphone 14 coupled to a first pre-amplifier 16, which in turn is coupled to a position estimation circuit (or stage) 18 and to a controller (or stage) 20. The controller 20 is also coupled to the position estimation circuit 18. Microphone apparatus 11 also includes a second microphone 22 coupled to a variable resistor 24 and a second pre-amplifier 26. The microphones 14 and 22 receive the acoustic signals generated by the acoustic source, and in response thereto, generate audio signals by transducing the acoutstic signals.

Variable resistor 24 may be a Labset resistor, in one example, for adjusting the output of the second microphone 22 that is provided to a signal pre-amplifier 26. Using the Labset Resistor 24 to adjust the output of the second microphone 22 enables the sensitivity of the second microphone 22 to be matched with the sensitivity corresponding to the first microphone 14. Matching the sensitivities of the microphones to some standard input enables the microphones' respective outputs to be matched, and facilitates the creation of a noise canceling microphone assembly. As will be described subsequently in further detail, noise canceling effects created by the dual microphones 14 and 22 are implemented when the output signals from the two mics are combined to obtain a difference therebetween.

Figure 2:
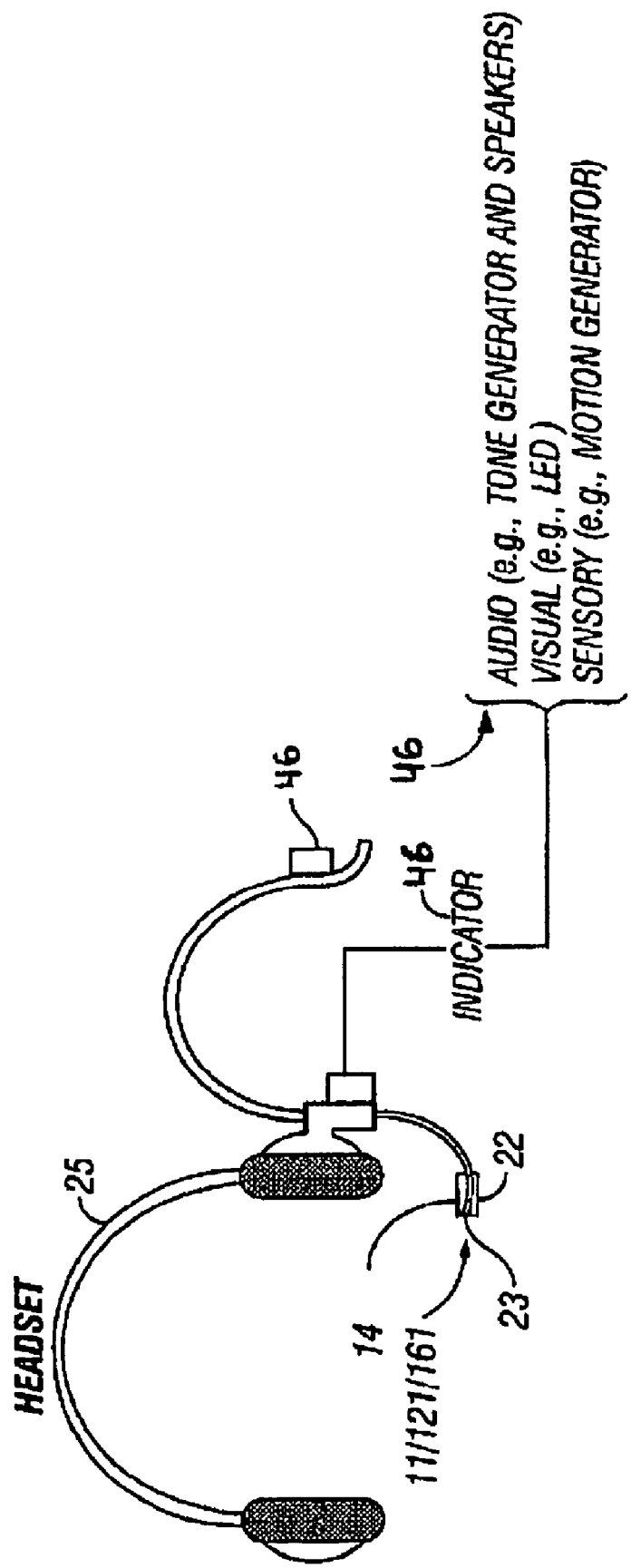
FIG. 2 is an illustration of a communications headset.
Figure 3:
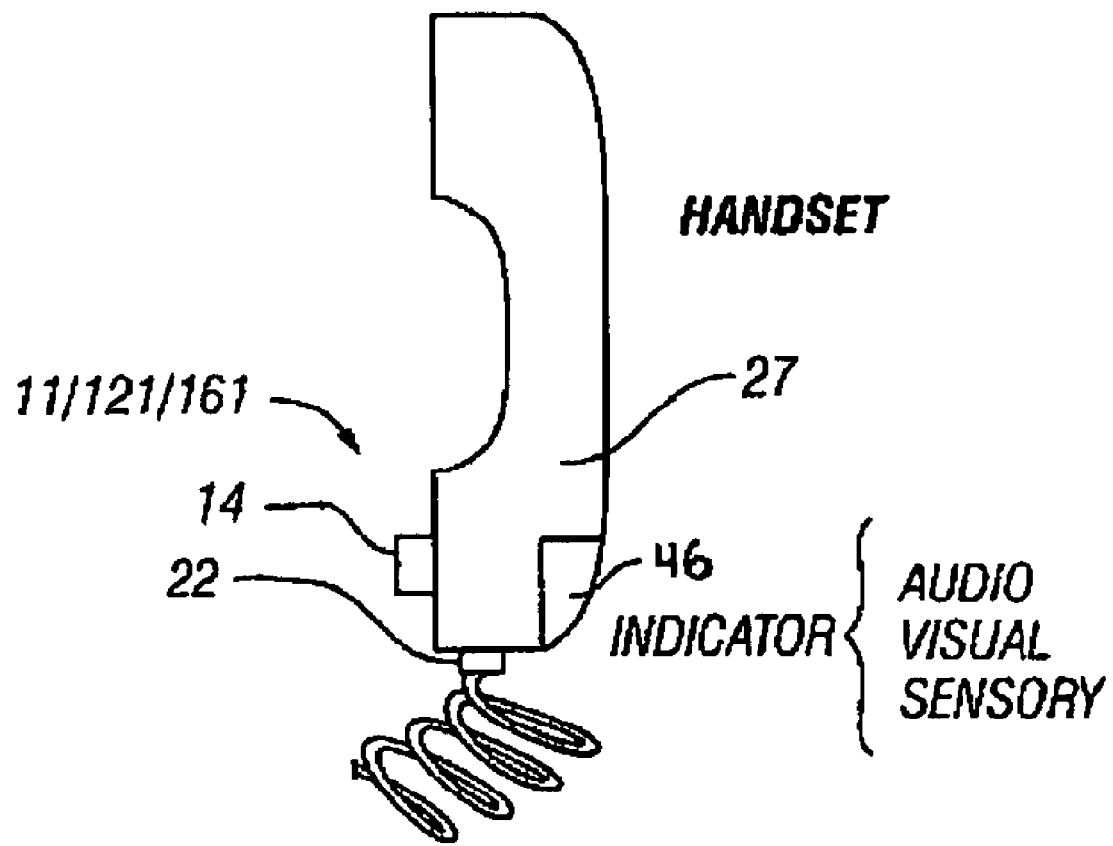
FIG. 3 is an illustration of a telephone handset.

In the various possible implementations of the present invention, the first microphone 14 is generally disposed closer than the second microphone 22 in proximity to the desired acoustic source 12. For example, the present invention may be implemented in a headset 25 as shown in FIG. 2. Additionally, and by way of example, the present invention may be implemented within a handset 27 of FIG. 3. In both implementations, the first microphone 14 is placed nearer to the acoustic source (e.g., user's mouth) than the second microphone 22. Referring back to FIG. 2, the first microphone 14 may be placed on a headset boom 23 close to the wearer's mouth, while the second microphone 22 may be generally located on the boom 23, but for example, at 0.25" to 0.5" (inches) away from the first microphone. The two microphones 14 and 22 collectively form a pair of pick-up points that are located close together, so that the frequency response of the microphones is not cut off at low frequencies. Also, the distance from the acoustic source 12 to the mic assembly 11 is selected and calibrated based upon the microphones selected and their associated efficiencies, and normal operating conditions, in addition to other factors known by those skilled in the art. It is noted that the desired microphones 14 and 22 may be part of the headset 25, and yet separate from the circuitry comprising the position estimation circuit 18 and the controller 20 described herein.

In the particular embodiment of FIG. 1, the first microphone 14 and the second microphone 22 are omnidirectional microphones that collectively form the pair of pick-up points. The omnidirectional microphones generally have equal sensitivity in any direction of the approaching sound waves. While omnidirectional microphones are not inherently noise canceling microphones, they may be adapted to form a noise canceling microphone assembly. For example, when the first and second microphones 14 and 22 are selected to be omnidirectional microphones, and the output of each of the first and second microphones are combined by taking the difference therebetween, a NC mic assembly 11 results where the difference is a combined signal that includes noise canceling.

Generally, NC mic assemblies are considered to be proximity microphones. In the embodiment of FIG. 1, the described arrangement allows the sampling of sound pressure at two (pick-up) points in space that are close to the acoustic source. Much of the effect of noise canceling features results from proximity effect, and directionality. The proximity effect is based upon the microphone being close to the acoustic source, where the sound wave has a generally spherical response pattern. By contrast, distant sounds, like for example, ambient or background noise, are typically associated with a plane wave having a directional response pattern. A NC mic assembly is generally calibrated using close and far thresholds, which respectively correspond to voice sound and ambient noise levels. As such, when the two pick-up points are located close to the acoustic source, most of the difference in the output signal of the two pick-up points results from the difference in sound pressure detected by the pick-up points. When only far field noise is present, the difference between output signals from the pair of pick-up points is very small because the sound pressures are substantially the same, resulting in low output from the NC microphone assembly. In this situation, the difference in phase amongst the acoustic sounds at the two pick-up points drives the output of the microphones.

Referring back to FIG. 1, the position estimation circuit 18 functions as a position sensor of the placement of the microphone assembly 11 relative to the acoustic source. Position estimation circuit 18 may be implemented, by way of example, with a first comparator 28 receiving the magnitude of the output signal (level) 32 of the first microphone 14 for comparison with a predetermined level. The predetermined level can be a numerical reference or an analog voltage used as a reference. The present invention works suitably well with either a digital numerical reference or an analog voltage used as a reference once the acoustic signals received at the microphone (14, 22) are transduced from the acoustic realm to the audio realm, that is, into audio signals. The predetermined level is a reference voltage level $V_{ref1}$ provided by a reference voltage source at second input 29.

The predetermined level may be selected to indicate whether or not the acoustic source is generating acoustic signals. One example of an acoustic source includes a user talking, wherein the predetermined level corresponds to a voice level being greater than background or ambient sound levels in many applications. To this end, and primarily for convenience, comparator 28 is referred to as providing the function of "voice" or "no voice" detection. Microphones in general respond to sound pressure impinged upon the diaphragms included therein, and produce electrical output that are dependent upon associated efficiencies of the microphones. Accordingly, and by way of example, the ambient sound levels for the described embodiments detected by an omnidirectional microphone are typically at 60 dbA, whereas the sound level of voice communication detected by the omnidirectional microphone are typically between 85-90 dBA. By contrast, with a noise canceling microphone, the ambient sound level of 60 dbA would be rejected more effectively than the sound level of 85-90 dbA for voice communication, thereby resulting in a larger signal-to-noise ratio than with an omnidirectional microphone.

The comparator 28 processes detected acoustic activity by comparing the magnitude of the output signal of the first microphone 14 with the reference voltage level $V_{ref1}$ to produce a signal 39 having two states. These two states will be further described subsequently when discussing Table 1. The voltage level of $V_{ref1}$ is selected generally based upon specific circuit values, and typically is set to equal the voltage produced by the first microphone 14 when the desired acoustic source 12 is at the maximum distance (under conditions of normal use) from the microphone 14. It will be recognized however, that the level of $V_{ref1}$ may be selected based upon other factors, including, the expected noise level in the environment, the types of sounds generated by the acoustic source 12, the relative distance between the microphones 14 and 22 from the acoustic source 12, the type of microphone 14 utilized, and/or other factors. If, for example, the microphones 14 and 22 are implemented in the headset 25 shown in FIG. 2, or the handset 27 shown in FIG. 3, then the relative distance between the acoustic source 12 (e.g., the speaker's mouth) and the microphones 14 and 22 can be determined.

Referring back to FIG. 1, a difference amplifier 30 detects the difference between the magnitude of the output level 32 of the first microphone and the magnitude of the output level 34 of the second microphone, and produces a signal 35 representing an output of the NC microphone assembly 11, generated from two omnidirectional mics 14 and 22. For convenience, reference will be made interchangeably to "NC mic assembly 11" when noise canceling features are derived from microphones 14 and 22, and to "microphone assembly 11" to generally refer to microphones 14 and 22.

A second comparator 36 is coupled to line 35 and compares the difference between signal 35 with a predefined proximity characteristic to generate a signal 40 representing the states of the noise canceling microphone assembly 11 being mispositioned or positioned-properly under normal operating conditions relative to the acoustic source 12. The predefined proximity characteristic can be implemented with a predetermined voltage level $V_{ref2}$ that establishes a threshold level. This threshold level $V_{ref2}$ represents a threshold for indicating when the NC mic assembly 11 is mispositioned relative to the acoustic source 12, can be selected similarly to the selection of $V_{ref1}$ as already described, but with calibration corresponding to the voltage level of signal 35 produced by the NC mic assembly 11. Comparator 36 compares signal 35 to this threshold level $V_{ref2}$ to determine whether the NC mic assembly 11 is positioned correctly with respect to the acoustic source 12. The significance of the states of signal 40 are further described below with respect to Table 1.

Both the output 39 from comparator 28, and the output 40 from comparator 36 are coupled to inputs of AND-gate 42 for producing a error signal 44 representing the logical sum of signals 39 and 40. The error signal 44 represents the combination of states entailing whether voice activity is being sensed and whether misposition of the NC microphone assembly 11 is being sensed. As will be described in more detail, the error signal 44 can be used to select the output 52 of system 10 based on the output of either the omnidirectional microphone 14 or the NC mic assembly 11.

TABLE 1

Truth Table for AND Gate 42

| Signal 39 | Signal 40 inverted | Signal 44 | Switch 48 | Output 52 |
|---|---|---|---|---|
| 0 (no voice) | 0 (proper position) | 0 | 50 | NC |
| 0 (no voice) | 1 (misposition) | 0 | 50 | NC |
| 1 (voice) | 0 (proper position) | 0 | 50 | NC |
| 1 (voice) | 1 (misposition) | 1 | 56 | Omni |

Referring to Table 1, a truth table is shown indicating the states of signals 39, 40 and 44. When the state of signal 39 is a logical one (i.e., TRUE or HIGH), the first microphone 14 is detecting acoustic activity from source 12, otherwise signal 39 is a logical zero (i.e., FALSE or LOW) indicating a "no voice" state. Accordingly, when the state of signal 39 is a FALSE, the first microphone 14 does not detect acoustic activity from source 12, just ambient (far-field) noise. Signal 40 is inverted prior to being received by comparator 42, and has two states that fluctuates between a zero (FALSE or LOW) and a one (TRUE or HIGH), indicating that the NC microphone assembly 11 is, respectively, below or at the threshold level $V_{ref2}$. When signal 40 is in a LOW state, the microphone assembly 11 is properly positioned with respect to the acoustic source, and when signal 40 is in a HIGH state, the NC microphone assembly 11 is mispositioned.

Still referring to Table 1, when the AND gate is at a HIGH state, the error signal 44 causes switch 48 to be set to position 56. This situation indicates that a user is talking and that the NC mic assembly 11 is mispositioned. When switch 48 is in position 56, the audio output 52 is received from the omnidirectional mic 14, which has equal position sensitivity of approaching sound. When the AND gate is at a LOW state, the error signal 44 causes switch 48 to be set to position 50. This situation indicates either that a user is not talking (don't care whether NC mic assembly 11 is properly positioned or not), or that the user is talking and the NC mic assembly 11 is positioned properly. When switch 48 is in position 50, the audio output 52 is received from the combined signal 47 representing the NC mic assembly 11, which is position sensitive to the direction of the approaching sound.

Referring to FIG. 1, the error signal 44 may be coupled to an indicator 46 which is capable of producing a representation of whether the NC microphone apparatus 11 is mispositioned or properly positioned. Reference is made back to Table 1 to understand the semantics of whether NC mic assembly 11 is mispositioned or not, in terms of combinations of HIGH and LOW states input and output out of AND gate 42. The indicator 46 would also be capable of using the HIGH and LOW states of error signal 44 to provide notification to a user of the need for positional correction of the microphone apparatus 11. Indicator 46 receives signal 44 as feedback in order to notify the user of the mispositioned mic assembly 11. It will be appreciated that indicator 46 may comprise a variety of embodiments, including the following, by way of example: a light indicator positioned on or proximate to the microphone boom; a light indicator (e.g., light emitting diode) disposed on the headset adapter; an audible beep or tone (e.g., from a tone generator and speaker); a visual indicator that is a plug-in accessory for the microphone assembly; and other visual or auditory or sensory signals. Sensory indicators could include a motion generator would vibrate, by way of example. The indicator 46 could also be part of a plug-in accessory to a headset, handset, or incorporated as part of an adapter used with the headset or handset. When the positioning error is corrected, the polar pattern of the microphone apparatus is optimized for noise rejection and the indicator is turned off, that is, disengaged.

The operation of system 10 will now be described in further detail. When the user is not talking or when the user is talking and the microphone assembly 11 is positioned correctly (i.e., in normal ordinary use) relative to the acoustic source 12, AND-gate 42 provides a error signal 44 that is used to electrically control switch 48 of controller 20. Signal 44 sets switch 48 to a first position 50 in order to provide high quality noise canceling signal 47 at output 52 by utilizing the difference between the output 32 of the first microphone and the output 34 of the second microphone 22. Signal 47 represents this difference by taking the algebraic sum of signals 32 and 34 using the summing circuit 54. When switch 48 is in first position 50, output audio signal 58 is derived from summing circuit 54, and is typically associated with a high quality noise canceling signal generally having a polar pattern in the nature of a figure-eight response pattern.

When the user is talking and the microphone assembly 11 is severely mispositioned relative to the acoustic source 12, the present invention provides a method of altering the directional response of the microphone assembly 11. When the mic assembly 11 is mispositioned, the difference signal on line 35 will be relatively small and generally not desirable to be used as an audio output 52. In order to compensate for this situation, controller 20 selects the omnidirectional microphone 14 to provide output signal 52. Referring back to Table 1, the AND gate 42 generates an error signal 44 that is HIGH and is used by controller 20 to set switch 48 to position 56, thereby coupling output 52 to the first microphone 14, which is an omnidirectional microphone having equal sensitivity to any angle of sound incidence. By selecting the first microphone 14 to provide audio output 52, angular mispositioning of the NC microphone assembly 11 is no longer problematic because microphone 14 becomes operational alone and without microphone 22. Additionally, proximity effect voice loss is reduced. It is noted that two omnidirectional pick-up point microphones are used in the implementation of FIG. 1 so that when the NC mic assembly 11 is mispositioned, one of the two microphones (i.e., 22) may be shut off, thereby allowing the proximity correction system 10 to switch from operating as a NC mic assembly 11 to an omnidirectional microphone 14, the latter of which is associated with less positional sensitivity. Accordingly, the present invention automatically compensates for the mispositioned microphone assembly 11 and provides a compromise until the proximity and positioning error of the microphone apparatus 11 is corrected.

Although not shown explicitly, an integrator for each microphone 14 and 22 may be included in the microphone apparatus 11 to receive the outputs 32, 34. In response, the integrator would be useful for providing a time average output for the microphones. Subsequently, this will be described further in a discussion of another embodiment pertaining to FIG. 7.

Figure 4:
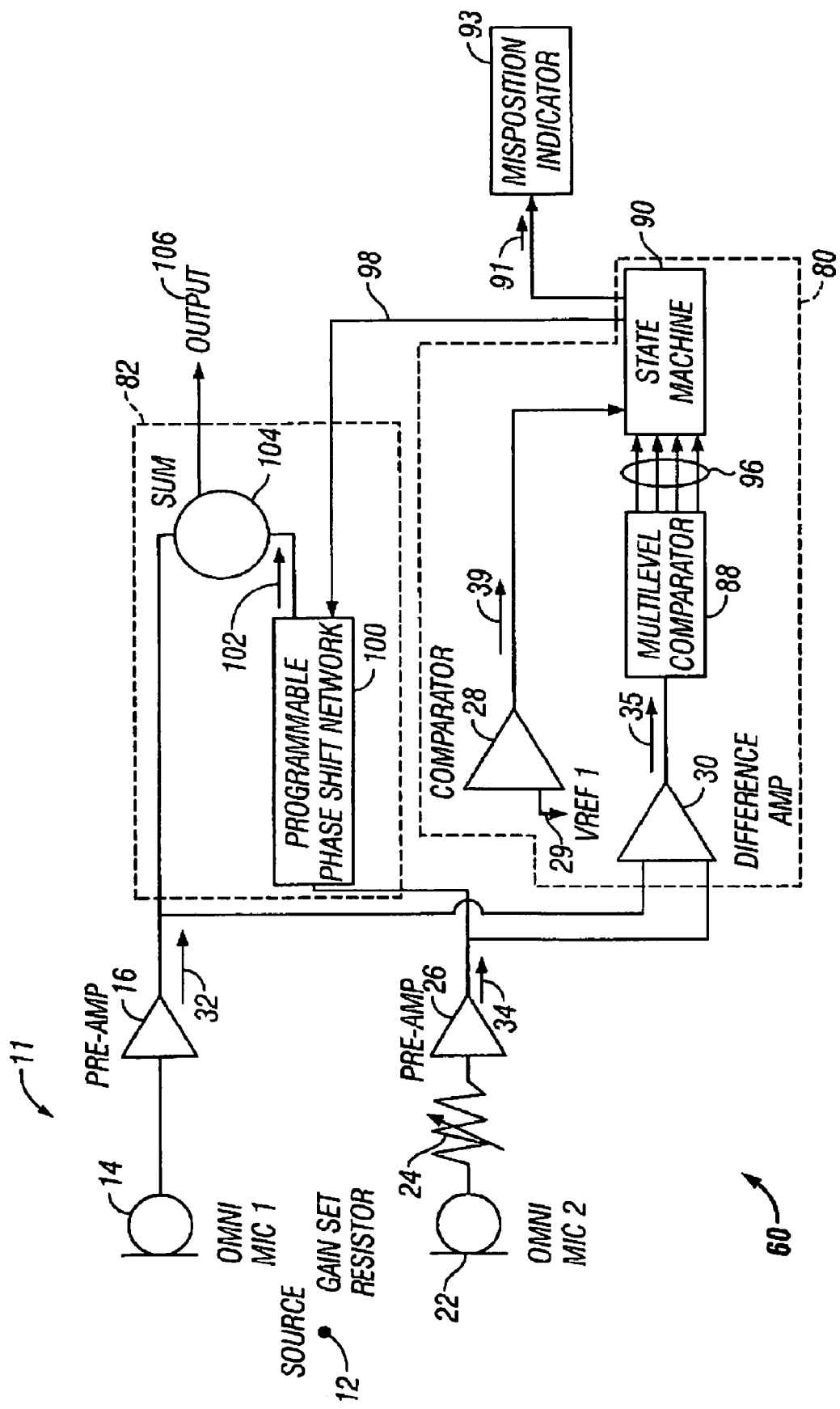
FIG. 4 is a functional block diagram of a second embodiment of a microphone proximity correction system having a programmable phase shift network.

B. Auto-Adjustment of Noise Canceling Microphones Producing A Range of Directional Responses FIG. 4 illustrates a functional block diagram of a microphone proximity correction system 60 in accordance with a second embodiment of the present invention. System 60 advantageously detects whether or not a NC mic assembly 11 is mispositioned relative to source 12, and automatically corrects degraded signal-to-noise ratio resulting from omnidirectional pick-up microphones 14 and 22 having angular and/or distance mispositioning relative to an acoustic source 12. The system 60 includes additional circuitry over system 10 in order to provide a finer resolution of automatic proximity correction of the NC microphone assembly 11, as opposed to only two output characteristics for output signal 52 of FIG. 1, namely a high quality noise canceling state (i.e., figure eight) and an omnidirectional state. As will be discussed further in detail, with the particular embodiment of FIG. 4, the far field directional characteristic for the microphone assembly 11 can be varied electrically from a polar pattern having a figure-eight pattern to an omnidirectional pattern, with a variety of patterns in-between, including by way of example, a polar pattern of cardioid, supercardioid, or hypercardioid. To the extent that similar components are utilized in both the systems 60 and 10, they are not discussed again for convenience, and are assumed to provide the previously described functionality.

System 60 includes position estimation circuit 80 coupled to a controller 82. The position estimation circuit 80 functions as a position sensor of both the first microphone 14 and of the NC mic assembly 11 relative to the acoustic source 12. Position estimation circuit 80 includes a comparator 28 that determines "voice" and "no voice" states 39, as previously described in FIG. 1. The position estimation circuit further includes a difference amplifier 30 that generates a combined output signal 35 representing a NC mic assembly 11 based on the pair of omnidirectional mics 14 and 22 as already described. This difference in combined signal 30 is fed into multi-level comparator 88, which compares signal 30 to a set of predetermined values that correspond to progressive signal output levels of NC microphone assembly 11, having angular and distance mispositioning relative to the acoustic source 12. When multi-level comparator 88 discerns the severity of mispositioning, it selects and forwards a corresponding signal 96 to the state machine 90. Signal 96 indicates the degree of severity in which NC microphone apparatus 11 is mispositioned. The various predetermined values of signal 96 may be implemented using a look-up table in combination with comparator circuitry that is readily available in the art.

The signals 39 and 96 are received by the state machine 90 and are used to select one of several predetermined error signals 98 that will cause a programmable phase shift network 100 to introduce an associated phase shift into one of the two microphones, namely microphone 22. State machine 90 may be implemented using a logic map (i.e., lookup table) to generate error signal 98 based upon a combination of states for signals 39 and 96.

In an alternative embodiment, the state machine 90 may generate a signal 91 which is fed to an indicator 93 capable of producing a representation of whether the NC microphone assembly 11 is mispositioned or not relative to the acoustic source 12. The indicator 93 has been previously described with reference to indicator 46.

Controller 82 includes the programmable phase shift network 100 that receives the microphone output signal 34 from microphone 22. The programmable phase shift network 100 also receives the signal 98 from state machine 90. Error signal 98 electronically manipulates a phase delay into one of the two microphones. By introducing a phase shift in signal 34, a different pick-up polar response pattern may be derived on signal 102. For example, a range of different response patterns can include a figure eight, cardioid, hypercardioid and omnidirectional response patterns, the advantageous of such will become clear upon further discussion below.

To obtain a cardioid directional response, a phase shift is introduced in the output signal of one of the omnidirectional microphones. The state machine 90 contains a mapping of states, each of which allows the selection of a pick-up pattern that suits the degree of mispositioning. The information from the state machine 90 is provided to the programmable phase shift network 100 to introduce the appropriate level of phase shift to enable the desired directional response.

Rather than providing figure eight and omnidirectional microphone responses using the system 10 of FIG. 1, the system 60 of FIG. 4 allows intermediate levels of microphone polar response patterns using the programmable phase shift network 100. The programmable phase shift network 100 introduces a phase shift in signal 34 on-the-fly and in order to compensate for the severity in microphone assembly 11 mispositioning. For example, network 100 generates a signal 102 that may be one of a series of directional (and polar) response patterns between figure eight and omnidirectional response patterns, including cardioid and hypercardioid polar response patterns. With each incremental change from a figure eight, to cardioid, to hypercardioid, and to an omnidirectional response pattern, the intermediate directional response patterns are beneficial in providing some degree of noise canceling features, yet with a lesser degree for signal dropoff should mispositioning of the NC microphone assembly 11 continue to become more problematic. As an example, a slight degree of misposition for NC mic assembly 11 may be better compensated for when system 60 produces an audio output 106 that has a cardioid response pattern, instead of an omnidirectional response pattern. In this example, clearly with a cardioid response pattern, some noise canceling is still provided at output 106, as opposed to none at all with an omnidirectional response pattern.

Controller 82 also includes an algebraic summing circuit 104 for determining the difference between signals 32 and 102. By determining the difference between signals 32 and 102, controller 82 generates a NC microphone audio output 106.

In the situation where the user is talking and where the microphones assembly 11 is mispositioned with respect to the acoustic source 12, the level of mispositioning is represented by signal 96. For example, when signal 35 has a smaller difference, this may indicate a larger degree of angular and proximity mispositioning between the microphone assembly 11 and the acoustic source 12. Furthermore, the output signal 39 of comparator 28 is HIGH when voice activity is detected by first microphone 14. In these situations, the state machine 90 selectively controls the programmable phase shift network 100 by generating a signal 98 that selects the amount of delay for programmable phase shift register to introduce into signal 34. Depending on the severity of mispositioning, the phase shift may introduce a range of noise canceling levels from a figure-eight polar pattern, to a hypercardioid, to cardioid and to omnidirectional polar patterns. Each automatic and successive adjustment towards an omnidirectional pattern increases the tolerance for angular and proximity mispositioning at the expense of signal-to-noise ratio degradation.

With the embodiment of system 60 shown in FIG. 4, the present invention provides a solution for those situations where the high quality noise canceling features of an NC mic are desirable, but not necessarily its high position sensitivity characteristic. The high position sensitivity of a NC mic often makes it position sensitive and ill-suited for being mispositioned relative to the acoustic source. On the other hand, omnidirectional microphones are not position sensitive, but do not generally include NC features. An aspect of the present invention provides a microphone directional (and polar) response that is intermediate to the characteristics associated with the NC mic and the omnidirectional mic.

C. Other Embodiments

Figure 5:
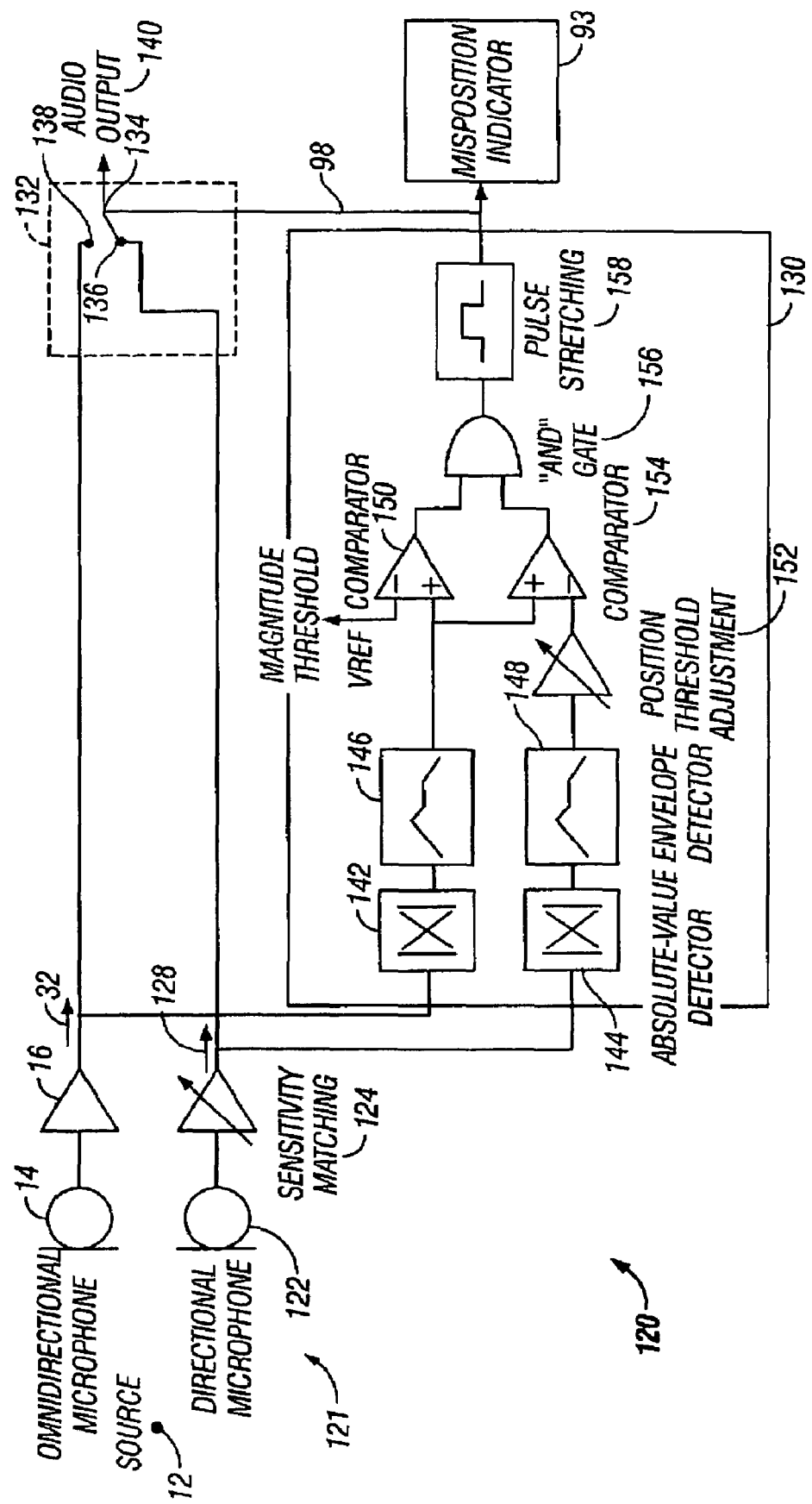
FIG. 5 is a functional block diagram of a third embodiment of a microphone proximity correction system having a directional microphone and an omnidirectional microphone.

FIG. 5 illustrates a third embodiment of the present invention. Here, a microphone proximity correction system 120 includes a microphone assembly 121 comprising a first microphone 14 receiving acoustical signals from an acoustic source 12 and coupled to a pre-amplifier 16. Microphone assembly 121 further includes a second microphone 122 coupled to a sensitivity matching circuit 124. The sensitivity matching circuit 124 matches the microphones 14 and 122 according to a standard output, so that noise canceling characteristics may be facilitated. The first microphone 14 is an omnidirectional pick-up microphone as previously described, and the second microphone 122 is a directional NC microphone.

Noise canceling effects may be derived from a single microphone for the second microphone 122. In order to do so, the pair of pick-up points for a single microphone may comprise two openings (orifices) closely spaced together similar to how microphones 14 and 22 have been described. To this end, one opening is generally closer than the second opening in proximity to the desired acoustic source 12. Noise canceling effects are achieved using the single microphone when sound pressure originating from the acoustic source 12 is brought to both sides of a diaphragm within the single microphone. The two openings representing the pair of two pick-up points are spatially close together, typically, disposed 0.25 to 0.5 inches apart for voice communication applications as already described. The single directional microphone 122 would replace the second microphone 22 shown in FIGS. 2-3, and would work suitably well in accordance with the present invention.

Even though a directional NC microphone 122 is used with the present invention, it should be preferably located close to the acoustic source 12 for the reasons already described. To this end, the single NC directional mic 122 is also considered to be proximity microphone, and generally allows the sampling of sound pressure at two points in space that are close to the acoustic source.

By comparison, the omnidirectional microphone 14 is located closer in proximity to acoustic source 12 than the directional microphone 122. With the sensitivity matching circuit 124, the sensitivity of the directional microphone 122 is adjusted to be compatible with the sensitivity of omnidirectional microphone 14 at the nominal operating distance of microphone apparatus 121. It will be appreciated that sensitivity matching circuit 124 may comprise typical circuit components such as a variable amplifier. Microphone 14 generates a signal 32 and microphone 122 generates a signal 128 using the previously described components. Both signals 32 and 128 are transmitted to a position estimation circuit 130 and to a controller 132.

Controller 132 includes an automatic selection switch 134 that electronically switches between a first state 136 and a second state 138 in order to provide an output audio signal 140. When switch 134 is in the first state 136, output 140 is coupled to signal 128 originating from the second microphone 122 and receives noise canceling microphone output. When switch 134 is in the second state 138, output 140 is coupled to signal 32 originating from the first microphone 14 and receives omnidirectional microphone output.

The position estimation circuit 130 includes: a first absolute value detector 142 receiving signal 32 and coupled to an envelope detector 146; and a second absolute value detector 144 receiving signal 128 and coupled to a second envelope detector 148. By way of example, the absolute-value detectors 142 and 144, and the envelope detectors 146 and 148 establish the magnitude of each signal 126, 128, respectively. Envelope detection is also useful for time averaging of the output signals from the microphones, because in general, it is not practicable to compare the outputs at an exact point in time due to slight differences in phases associated with each signal. To this end, the envelope detectors 146 and 148 typically smooth the output signals associated with the microphones 32 and 122 so that they may be compared over a broader window of time.

The microphone output signal 32 originating from the omnidirectional microphone 14 is coupled to a positive input of a comparator 150. Comparator 150 is similar to comparator 28 (in FIG. 1) and functions to determine the "voice" or "no voice" states associated with microphone 14 detecting sound activity from acoustic source 12, as previously described.

The detected signal 128 originating from the directional microphone 122 is amplified using a position threshold adjustment circuit 152 and then applied to the negative input of a comparator 154. The positive input of comparators 150 and 154 are coupled together. The position threshold adjustment circuit 152 may comprise an amplifier, which in combination with comparator 154 determines whether the signal from the directional microphone 122 is sufficiently loud compared to the signal from the omnidirectional microphone 14. By doing so, comparator 154 outputs a signal having a two states indicating whether the microphone assembly 121 is mispositioned or positioned properly relative to the acoustic source 12. In particular, states for the outputs of comparators 150 and 154 are listed in Table 2 below.

TABLE 2

Truth Table for AND Gate 156

| Output of Comparator 150 | Output of Comparator 154 | Output of AND gate 156 | Switch 134 | Output 140 |
|---|---|---|---|---|
| 0 (no voice) | 0 (proper position) | 0 | 136 | NC |
| 0 (no voice) | 1 (misposition) | 0 | 136 | NC |
| 1 (voice) | 0 (proper position) | 0 | 136 | NC |
| 1 (voice) | 1 (misposition) | 1 | 138 | Omni |

Table 2 is similar to Table 1 previously described, in that the output of the AND gate 156 is used as an error signal 98 to selectively control switch 134. When voice activity is detected by comparator 150 and when the microphone assembly 121 is mispositioned relative to the acoustic source 12, switch 134 is electronically set to position 138, so that audio output 140 is driven by the omnidirectional microphone 14. For all other situations, switch 134 is set to position 136 so that the NC mic 122 provides a microphone output to audio output 140.

Position estimation circuit 130 further includes a pulse stretching circuit 158 following the AND gate 156. The pulse stretching circuit 158 enables the indication of a mispositioning to be maintained long enough to provide error signal 98 so that switch 134 does not electronically switch from positions 134 and 136 at rate that causes audible "chopping" of the output signal 140. The prevention of audible "chopping" is beneficial for preventing acoustic signals from the user's voice from "cutting-out" with severely mispositioned microphone assembly 121.

Although not explicitly shown, it will be appreciated by those skilled in the art that band-pass filters inserted in front of the absolute-value detectors 142 and 144 may be used to reject noise and to improve the reliability of position detection of the microphone assembly 121.

Figure 6:
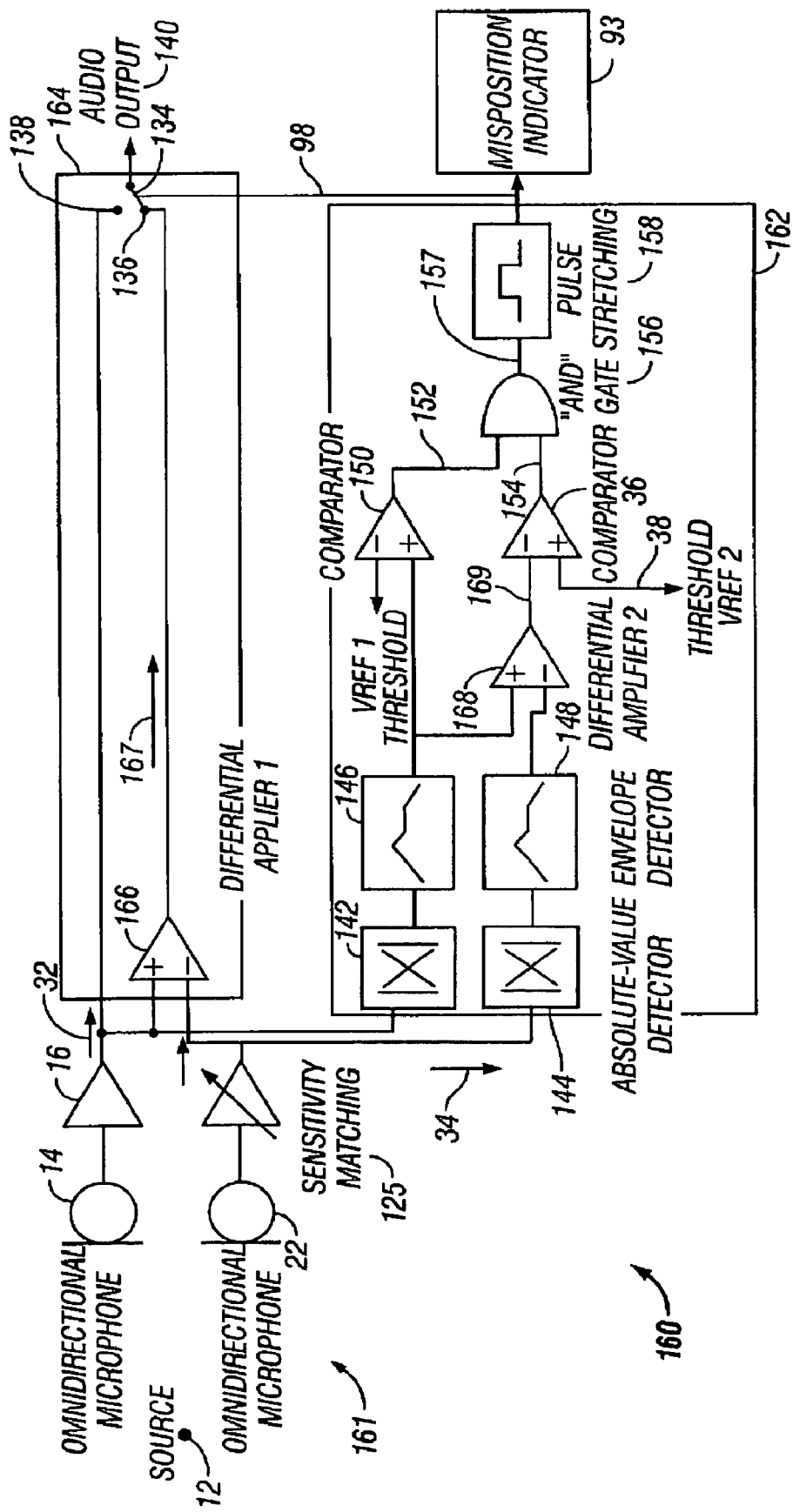
FIG. 6 is a functional block diagram of a fourth embodiment of a microphone proximity correction system, and an improvement over the microphone proximity correction system of FIG. 1.

FIG. 6 illustrates a fourth embodiment of the present invention. Here, a microphone proximity correction system 160 includes a microphone apparatus 161. Microphone apparatus 161 is similar to microphone apparatus 11, and includes: a first microphone 14 receiving acoustical signals from an acoustic source 12 and coupled to a pre-amplifier 16; and a second microphone 22 coupled to a sensitivity matching circuit 125. The sensitivity matching circuit 125 is similar to sensitivity matching circuit 124 and to the function of the Labset resistor 24 and pre-amplifier 16 of FIG. 1. In general, sensitivity matching circuit 125 matches the microphones 14 and 22 according to a standard output, so that noise canceling characteristics may be facilitated.

The first and second microphones 14 and 22 omnidirectional pick-up microphones as previously described. Microphone 14 generates a signal 32 and microphone 22 generates signal 34, similar to that described with the embodiment of FIG. 1. Both signals 32 and 34 are transmitted to a position estimation circuit 162 and to a controller 164.

Controller 164 includes an automatic selection switch 134 that electronically switches between a first state 136 and a second state 138 in order to provide an output signal 140. A differential amplifier 166 receives signal 32 at a positive input, and receives signal 34 at a negative input. Differential amplifier 166 combines the magnitudes of signals 32 and 34 to create a NC microphone signal 167. When switch 134 is in the first state 136, output 140 receives a high quality NC microphone signal 167, and when switch 134 is in the second state 138, output 140 receives an omnidirectional microphone signal 32 originating from the first microphone 14.

The position estimation circuit 162 includes previously described components, namely: a first absolute value detector 142 receiving signal 32 and coupled to an envelope detector 146; a second absolute value detector 144 receiving signal 34 and coupled to a second envelope detector 148; and a comparator 150. Comparator 150 generates an output signal 152 indicating "voice" and "no voice" states as already described, with respect to the detected output signal 34 originating from the omnidirectional microphone 14. Differential amplifier 168 provides a NC microphone output signal 169 based on the microphone signals 32 and 34. NC microphone output signal 169 is similar to signal 35 in FIG. 1. A comparator 36 is coupled to line 169 and compares the difference NC signal 169 with a predefined proximity characteristic to generate a signal 154 having states of HIGH or LOW as shown in Table 3, indicating respectively whether the noise canceling microphone assembly 161 is mispositioned or positioned-properly under normal operating conditions relative to the acoustic source 12. The predefined proximity characteristic can be implemented with a predetermined voltage level $V_{ref2}$ that establishes a threshold level, as already described in FIG. 1.

TABLE 3

Truth Table for AND Gate 156

| Signal 152 | Signal 154 inverted | Signal 157 | Switch 134 | Output 140 |
|---|---|---|---|---|
| 0 (no voice) | 0 (proper position) | 0 | 136 | NC |
| 0 (no voice) | 1 (misposition) | 0 | 136 | NC |
| 1 (voice) | 0 (proper position) | 0 | 136 | NC |
| 1 (voice) | 1 (misposition) | 1 | 138 | Omni |

Both outputs 152 and 154, respectively, from the comparators 150 and 154 are represented in Table 3, and are received by AND gate 156. AND gate 156 performs a similar function of AND gate 42 as will be now described. When the user is not talking or when the user is talking and the microphone assembly 161 is positioned correctly (i.e., in normal ordinary use) relative to the acoustic source 12, AND-gate 156 provides an output 157 that is used as an error signal 98 to electrically control switch 134 of controller 164. Signal 98 sets switch 134 to a first state 136 in order to provide high quality noise canceling signal 167 at output 140 by utilizing the difference between the output 32 of the first microphone 14 and the output 34 of the second microphone 22. Signal 167 represents this difference between the magnitudes of signals 32 and 34 using the differential amplifier 166. When switch 134 is in first state 50, output audio signal 140 is a high quality noise canceling signal generally having a polar pattern in the nature of a figure-eight response pattern.

When the user is talking and the microphone assembly 161 is severely mispositioned relative to the acoustic source 12, the present invention provides a method of altering the directional response of the microphone assembly 161. When the mic assembly 161 is mispositioned, the difference signal on line 169 will be relatively small and generally not desirable to be used as an audio output 140. In order to compensate for this situation, controller 164 selects the omnidirectional microphone 14 to provide output signal 140. In Table 3, the AND gate 156 generates an error signal 98 based on output signal 157 that is HIGH and is used by controller 164 to set switch 134 to position 138, thereby coupling output 140 to the first microphone 14, which is an omnidirectional microphone having equal sensitivity to any angle of sound incidence. By selecting the first microphone 14 to provide audio output 140, angular mispositioning of the NC microphone assembly 161 is no longer problematic because microphone 14 becomes operational alone and without microphone 22.

The pulse stretching circuit 158 ensures that the indication of a mispositioning is maintained long enough as already described in FIG. 5. Furthermore, the pulse stretching circuit 158 maintains the omnidirectional state of system 160, otherwise the large difference signal would cause an inappropriate switching back to the directional mode. Furthermore, indicator 93 has already been described.

Because system 160 does not detect the ratio of the levels of the microphones 14 and 22, but instead detects the differences in their output levels, increases in the level of the acoustic source 12 may ultimately result in a difference signal along line 167 that is large even though the ratio of sound pressures detected by the microphones is still low due to incorrect positioning.

The operation of system 160 will now be described, with reference to FIG. 1. When a user is not talking, the output 152 of comparator 150 is LOW, thereby leaving selector switch 134 in state 136 and preventing the selector switch 134 from switching regardless of the output state 154 of comparator 36. Accordingly, output 140 receives combined signal 167 representing a NC microphone assembly 161.

When the user is talking and the microphone apparatus 161 is severely mispositioned relative to the acoustic source 12, the combined difference signal 169 is relatively small and generally not useful for audio output 140. The input 169 to comparator 36 will be below the threshold value $V_{ref2}$, forcing the output of comparator 36 to be HIGH, indicating a misposition. Since the output of comparator 150 will also be HIGH (i.e., indicating that the user is talking), the output of AND gate 156 will be HIGH, thereby causing switch 134 to be electronically set to state 138. Accordingly, output 140 will receive the signals representing omnidirectional microphone performance of microphone 14. By switching to a single microphone 14 operating with an omni-directional pattern (and having an equal sensitivity to any angle of sound incidence, angular mispositioning is no longer problematic and the proximity effect voice loss is reduced.

Figure 7:
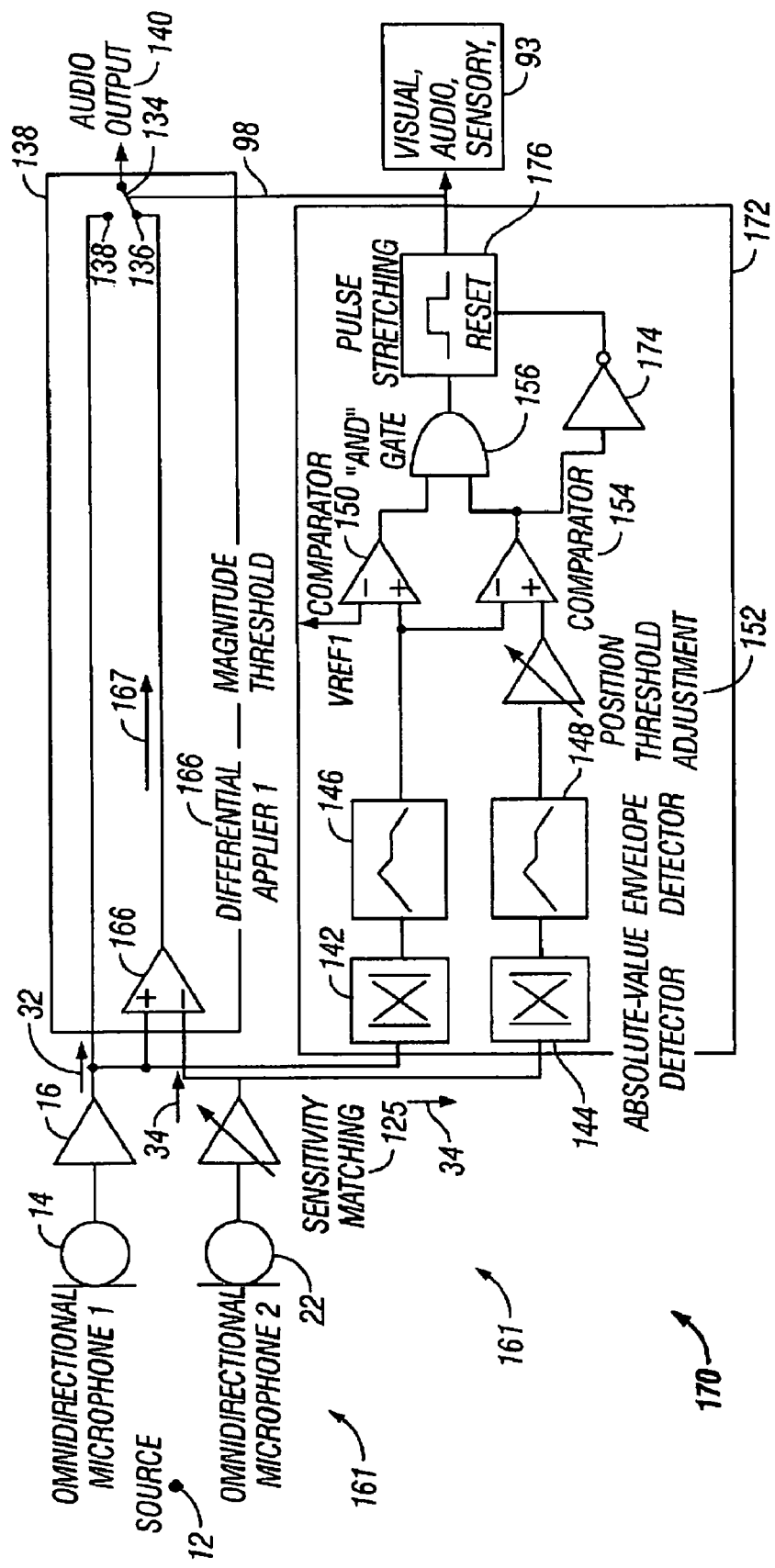
FIG. 7 is a functional block diagram of a fifth embodiment of a microphone proximity correction system utilizing a ratio of the first microphone to the second microphone for detecting mispositioning.

FIG. 7 illustrates a fifth embodiment of the present invention. Here, selected components of system 170 are similar to that of systems 120 and 160 in FIGS. 5-6, respectively, and to that end, like reference numerals have been included for convenience. System 170 also includes a controller 138 coupled to a position estimation circuit 172.

Position estimation circuit 172 includes, as previously described: first and second absolute value detectors 142 and 144; envelope detectors 146 and 148; a position threshold adjustment unit 152; comparators 150 and 154; and AND gate 156. Additionally, position estimation circuit 172 includes an inverter 174 coupled to comparator 154, AND gate 156 and a pulse stretching unit 176. Pulse stretching unit 176 includes a Reset function that is invoked when the microphone assembly 161 is properly positioned relative to acoustic source 12. Pulse stretching is reset when NC mic assembly 161 is positioned properly so that switch 134 is electronically set to state 136 to ensure high quality NC microphone output is provided to audio output 140. The ratio detection scheme used in this embodiment provides a positive indicator of correct position. The error signal 98 produced can not only be used to inhibit the omnidirectional mode, but can also be used to terminate any current pulse resulting from a previous misposition indication. This, in turn, makes system 170 more responsive and less susceptible to errors occurring with switch 134 being in a proper state.

Comparator 154 compares the magnitude of the output level 34 of microphone 22 to the magnitude of the output level 32 of microphone 14, which includes a controlled amount of additional gain. If the ratio of the sound pressures at the microphones (i.e., microphone 14 to microphone 22) is less than the gain of position threshold adjustment circuit 152, the output of comparator 154 will be HIGH resulting in an indication of misposition, provided that the overall magnitude is sufficient to activate comparator 150, indicating "voice" and "no voice" states. If the ratio of pressures is greater than the gain of the position threshold adjustment circuit 152, the output of comparator 154 will be LOW, which indicates that the proper positioning of the microphone assembly 161 has been sensed. It will be appreciated by those skilled in the art that the ratio of pressures is independent of source level, except near the noise floor, and is primarily dependent on geometric factors. By way of example, some of these geometric factors include the microphone spacing, angle, and distance of the microphone from the acoustic source. A large ratio can only be produced by properly positioned microphones as a result of acoustic signals received from a nearby source.

Figure 8:
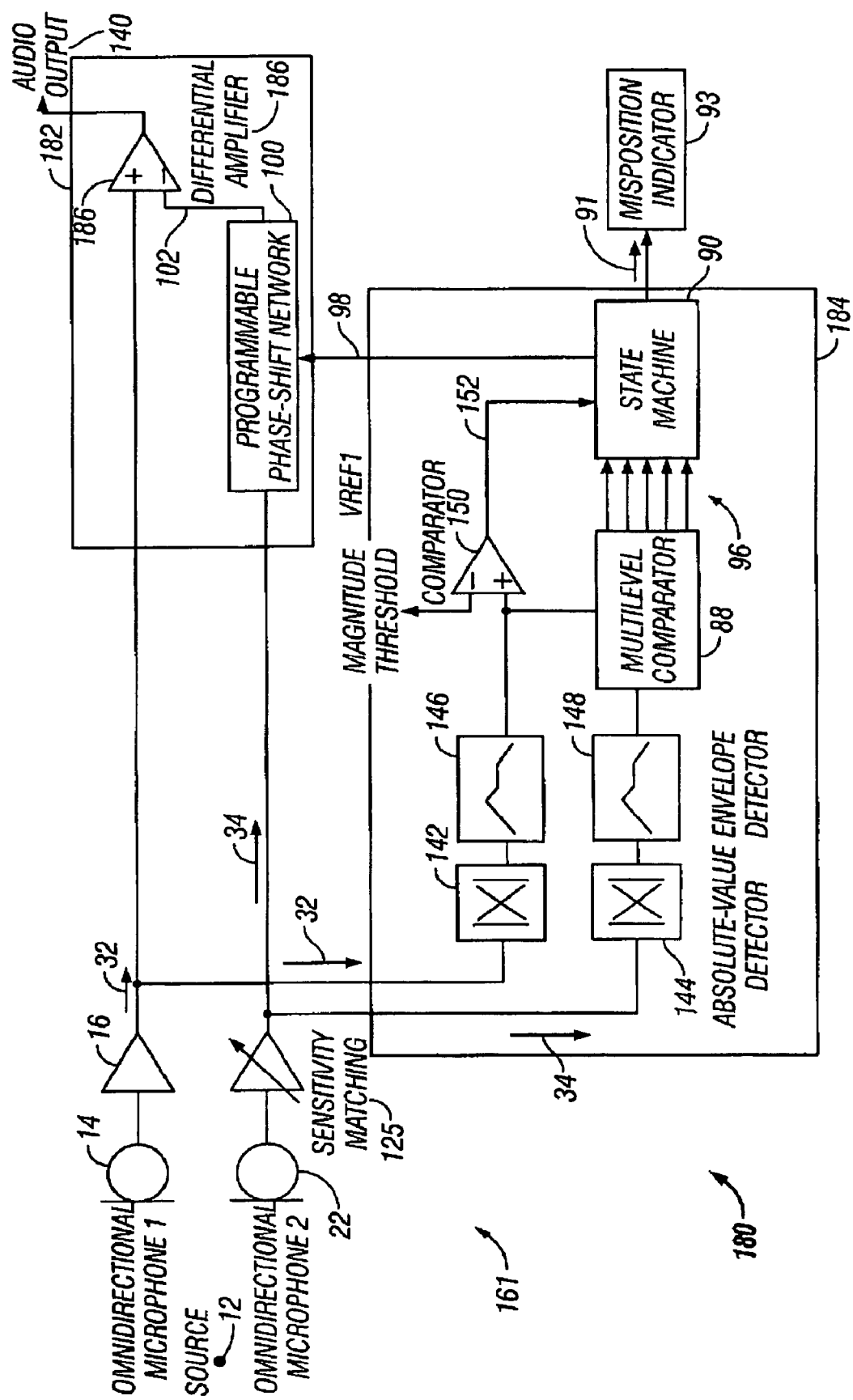
FIG. 8 is a functional block diagram of a sixth embodiment of a microphone proximity correction system, and an improvement over the microphone proximity correction system of FIG. 4.

FIG. 8 illustrates a sixth embodiment of the present invention. Here, selected components of system 180 are similar to that of systems 60 and 170 in FIGS. 4 and 7, respectively, and to that end, like reference numerals have been included for convenience. The system 180 includes additional circuitry than system 170 in order to provide a finer resolution of automatic proximity correction of the NC microphone assembly 161. By contrast, system 170 included two states for output signal 140 in FIG. 7, namely a high quality noise canceling state having generally a figure eight polar response pattern and an omnidirectional state. The functions of these previously described components are omitted so as not to obscure the invention with repetitive details. System 180 includes a controller 182 coupled to a position estimation circuit 184.

Position estimation circuit 184 includes the following components, already described: first and second absolute value detectors 142 and 144; a multilevel comparator 88; a comparator 150; and a state machine 90. The controller 182 includes a programmable phase shift network 100 that receives the combined signal 98 from state machine 90. The programmable phase shift network 100 also receives the microphone output signal 34 from microphone 22, and introduces a phase shift to generate a delay signal 102. The delay signal 102 represents the degree that the NC microphones assembly 161 is mispositioned relative to the acoustic source 12. Controller 182 also includes a differential amplifier 186 receiving signals 32 and 102, and generating a NC microphone signal for output 140.

In particular, the polar pattern and the proximity effect, in concert, can be adjusted by varying the phase shift of the output 34 for microphone 22 before determining a difference between the output signals 32 and 102. The NC microphone apparatus 161 far field directional characteristic can be varied electrically from a polar pattern having a figure-eight pattern to an omnidirectional pattern, with a variety of patterns in-between, including by way of example, a polar pattern of cardioid, supercardioid, or hypercardioid.

The position estimation circuit 184 functions as a position sensor of both the first microphone 14 and of the NC mic assembly 161 relative to the acoustic source 12. Position estimation circuit 184 includes a comparator 150 that determines "voice" and "no voice" states, as previously described in FIG. 1. The output signals 32 and 34 from the microphones 14 and 22, respectively, are both fed into multi-level comparator 88, for comparison with a set of predetermined values that correspond to progressive signal output levels of NC microphone assembly 161 having angular and distance mispositioning relative to the acoustic source 12. When multi-level comparator 88 discerns the severity of mispositioning, it selects and forwards a corresponding signal 96 to the state machine 90. The output 152 of comparator 150 is also received by state machine 90 in order to select one of several predetermined error signals 98 that will cause a programmable phase shift network 100 to introduce an associated phase shift into one of the two microphones, namely the output signal 34 of microphone 22. State machine 90 may be implemented using a logic map (i.e., lookup table) to generate error signal 98 based upon a combination of states for signals 152 and 96. Error signal 98 electronically manipulates a phase delay into one of the two microphones. By introducing a phase shift in signal 34, a different pick-up polar response pattern may be derived on signal 102. For example, a range of different response patterns can include a figure eight, cardioid, hypercardioid and omnidirectional response patterns.

In an alternative embodiment, the state machine 90 may generate a signal 91 which is fed to an indicator 93 capable of producing a representation of whether the NC microphone assembly 161 is mispositioned or not relative to the acoustic source 12. The indicator 93 has been previously described with reference to indicator 46.

To obtain a cardioid directional response, a phase shift is introduced in the output signal of one of the omnidirectional microphones. The state machine 90 contains a mapping of states, each of which allows the selection of a pick-up pattern that suits the degree of mispositioning. The information from the state machine 90 is provided to the programmable phase shift network 100 to introduce the appropriate level of phase shift to enable the desired directional response.

With each incremental change from a figure eight, to cardioid, to hypercardioid, and to an omnidirectional response pattern, the intermediate directional response patterns is beneficial in providing some degree of noise canceling features, yet with a lesser degree for signal dropoff should mispositioning of the NC microphone assembly 161 continue to become more problematic.

Controller 182 also includes a difference amplifier 186 for determining the difference between signals 32 and 102. By determining the difference between signals 32 and 102, difference amplifier 186 generates a NC microphone signal for audio output 106.

The multilevel comparator 88 estimates the ratio of sound pressures for microphone 14: microphone 22, in a manner similar to the functions of comparator 154 of FIG. 7, except that the magnitude of the output signal 32 is compared to a set of predetermined gain values for the magnitude of the output signal 34, wherein the gain values correspond to progressive levels of mispositioning, rather than a single gain value. Both the output 152 from comparator 150 and the output 96 from the multi-level comparator 88, are received by state machine 90, which includes a logical map for driving the programmable phase shift network 100 of controller 182.

When the user is not talking or when the user is talking and the microphone apparatus 161 is positioned correctly relative to the acoustic source 12, the output of comparator 150 is low and the state machine 90 selectively controls the programmable phase shift network 100 to provide the highest quality noise canceling signal 102. Signal 102 is typically associated with a bidirectional polar pattern.

When the user is talking, the output of comparator 150 is high, and the microphone apparatus 161 is mispositioned, whereby the level of misposition is indicated by the multi-level comparator 88. For example, a lower ratio can be selected to indicate a greater degree of mispositioning. In response, the state machine 90 selectively controls the phase shift network 100 to introduce increasing values of delay in signal 34 to provide a range of noise canceling levels, having a polar pattern ranging from a figure-eight to hypercardioid, to cardioid, and to omnidirectional polar patterns. It should be understood that each successive adjustment towards an omnidirectional pattern increases the tolerances for angular and proximity misposition at the expense of SNR degradation.

Those skilled in the art will recognize that there are other means of implementing a programmable polar pattern such as using the sum of a single omnidirectional microphone with the bidirectional pair created by the difference between the microphones. In such a system, the state machine would control the summing network, which would replace the phase-shift network.

Although the invention has been described in considerable detail with reference to certain embodiments, other embodiments are possible. As will be understood by those of skill in the art, the invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A system for sensing and compensating for at least one error signal, the system comprising:
   an acoustic pick-up device having a first microphone disposed at a first distance from a desired acoustic source, and a second microphone disposed at a second distance from the desired acoustic source, each of the first microphone and the second microphone receiving acoustic signals generated from the desired acoustic source, and in response, transducing the acoustic signals into audio signals;

a position estimation circuit coupled to receive the audio signals from the first microphone and the second microphone, and adapted to produce, from the audio signals of both first and second microphones, an error signal to indicate angular and/or distance mispositioning of the acoustic pick-up device relative to the desired acoustic source that results in the acoustic signals received by the acoustic pick-up device failing to achieve proper or adequate noise cancellation and resulting in the audio signals being degraded; and a controller using the error signal to compensate for the acoustic pick-up device being mispositioned by providing the audio signals from at least one of the first microphone and the second microphone to an output.

2. The system according to claim 1, further comprising an indicator utilizing the error signal to generate an indication of the acoustic pick-up device being mispositioned.

3. The system according to claim 1, wherein the error signal is determined after the audio signals are received by the position estimation circuit.

4. The system according to claim 1, wherein the first microphone and the second microphone are both omnidirectional microphones.

5. The system according to claim 4, further comprising a noise canceling microphone signal adapted from a difference between the audio signals received from the first microphone and the audio signals received from the second microphone.

6. The system according to claim 1, wherein the controller includes a switch transferring the audio signals from one of the first and the second microphones to the output.

7. The system according to claim 1, wherein the controller includes a switch transferring a combined signal to the output, the combined signal generated from a difference between the audio signals received from the first microphone and the audio signal received from the second microphone.

8. The system according to claim 1, wherein the controller includes:

a device adapted to produce a combined signal based on the audio signals received from the first and the second microphones, wherein the error signal is used to select the combined signal to be transmitted to the output.

9. The system according to claim 8, wherein the device comprises a summing unit.

10. The system according to claim 1, wherein the position estimation circuit comprises a sensor capable of determining the acoustic pick-up device being mispositioned.

11. The system according to claim 1, wherein the controller includes:

a programmable phase shift network adapted to produce a range of phase shifts in the audio signals from the second microphone; and a device producing a combined signal based on those signals being phase shifted and on the audio signals received from the first microphone, the device being further capable of transferring the combined signal to the output.

12. The system according to claim 11, wherein the device comprises a summing unit.

13. The system according to claim 1, wherein the first microphone is disposed closer to the desired acoustic source than the second microphone.

14. The system according to claim 1, wherein the position estimation circuit comprises:

a device determining whether the desired acoustic source is operational; and coupled to the device, a sensor determining that the acoustic pick-up device is mispositioned.

15. The system according to claim 14, wherein the audio signals from at least one of the first microphone and the second microphone are provided to the output when the acoustic source is operational and when the sensor determines that the acoustic pick-up device is mispositioned according to a predetermined threshold that is exceeded.

16. The system according to claim 14, wherein the position estimation circuit further comprises:

a first circuit determining progressive levels of the acoustic pick-up device being mispositioned with respect to the desired acoustic source; and a second circuit determining a corresponding phase shift based on a particular one of the progressive levels determined, said corresponding phase shift being introduced with the audio signals received from the second microphone to produce delayed signals, the delayed signals being subtracted from the audio signals received from the first microphone with a result provided to the output.

17. The system according to claim 16, wherein first circuit comprises a multi-level comparator, and the second circuit comprises a state machine coupled to the multi-level comparator.

18. The system according to claim 16, wherein the corresponding phase shift causes a directional response of a combination of the first and second microphones to include one of a figure eight pattern, a cardioid pattern, a hypercardioid pattern, and an omnidirectional pattern.

19. A system for controlling a directional response of at least one of a first microphone and a second microphone, the system comprising:

first microphone means disposed at a first distance from a desired acoustic source;

second microphone means disposed at a second distance from the desired acoustic source, each of the first microphone means and the second microphone means receiving acoustic signals generated from the desired acoustic source, and in response thereto, transducing the acoustic signals into audio signals;

position estimation means coupled to receive the audio signals from the first and second microphone means, the position estimation means being adapted to produce, from the audio signals of both first and second microphones, an error signal that indicates angular and/or distance mispositioning of the first and second microphone means relative to the desired acoustic source that results in the acoustic signals received by the acoustic pick-up device failing to achieve proper or adequate noise cancellation and resulting in the audio signals being degraded; and control means using the error signal to compensate for the first and second microphone means being mispositioned by providing the audio signals from at least one of the first and second microphone means to an output.

20. The system according to claim 19, wherein said control means adjusts a polar pattern of the audio signals received from the first and second microphone means to provide the audio signals to the output.

21. The system according to claim 20, wherein the audio signals provided to the output include noise canceling as a result of a combination of the audio signals from the first and second microphone means.

22. A method of controlling a directional response of at least one of a first and second microphones, the method comprising:
- receiving acoustic signals generated by a desired acoustic source at a first microphone;
- receiving the acoustic signals at a second microphone;
- in response, the first and second microphones each transducing the acoustic signals respectively received into audio signals;
- detecting an error signal amongst the audio signals from both first and second microphones, the error signal indicates angular and/or distance mispositioning of the first and second microphones relative to the desired acoustic source that results in the acoustic signals received by the acoustic pick-up device failing to achieve proper or adequate noise cancellation and resulting in the audio signals being degraded;
- using the error signal to select the directional response corresponding to at least one of the first and second microphones in order to compensate for the first and second microphones being mispositioned; and
- providing the audio signals associated with the directional response selected to an output.

23. The method according to claim 22, wherein the audio signals provided to the output are a result of noise canceling generated by a difference between the audio signals associated with the first microphone and the audio signals associated with the second microphone.

24. The method according to claim 22, further comprising activating an indicator in response to receiving the error signal to indicate the first and second microphones being mispositioned with respect to the desired acoustic source.

25. The method according to claim 22, wherein the first and second microphones each comprises an omnidirectional microphone.

26. The method according to claim 22, further comprising:
- determining progressive levels of the first and second microphones being mispositioned with respect to the desired acoustic source;
- determining a corresponding phase shift based on a particular one of the progressive levels associated with the error;
- introducing the corresponding phase shift with the audio signals associated with the second microphone to produce delayed signals;
- providing at the output the delayed signals combined with the audio signals associated with the first microphone.

27. The method according to claim 22, wherein the directional response comprises one of a figure eight pattern, a cardioid pattern, a hypercardioid pattern, and an omnidirectional pattern.

28. A method of sensing and compensating for an error, the method comprising:
- receiving acoustic signals generated by a desired acoustic source at a first microphone;
- receiving the acoustic signals at a second microphone;
- in response, the first and second microphones each transducing the acoustic signals respectively received into audio signals;
- detecting an error signal amongst the audio signals associated with both the first and second microphones, the error signal indicates angular and/or distance mispositioning of the first and second microphones relative to the desired acoustic source that results in the acoustic signals received by the acoustic pick-up device failing to achieve proper or adequate noise cancellation and resulting in the audio signals being degraded; and
- using the error signal to selectively provide the audio signals from at least one of the first and second microphones to an output in order to compensate for the mispositioning.

29. The method according to claim 28, wherein the audio signals provided to the output include noise canceling as a result of a combination of the first and second microphones.

30. The method according to claim 28, wherein using the error signal to selectively provide the audio signals from at least one of the first and second microphones to an output comprises adjusting a directional response of at least one of the first and second microphones.

31. The method according to claim 30, wherein the directional response comprises one of a figure eight pattern, a cardioid pattern, a hypercardioid pattern, and an omnidirectional pattern.

32. The method according to claim 30, wherein the directional response comprises one of a figure eight pattern, and an omnidirectional pattern.

33. The method according to claim 28, wherein detecting an error signal comprises:
- determining whether the desired acoustic source is operational; and
- determining whether the first and second microphones are mispositioned relative to the desired acoustic source.

* * * * *